United States Patent
Trecapelli et al.

(10) Patent No.: US 12,138,724 B2
(45) Date of Patent: *Nov. 12, 2024

(54) SMART TOOL SYSTEM

(71) Applicant: Gemini Precision Machining, Inc., Bad Axe, MI (US)

(72) Inventors: Anthony Trecapelli, Leonard, MI (US); David W. Barton, Port Matilda, PA (US)

(73) Assignee: GEMINI PRECISION MACHINING, INC., Bad Axe, MI (US)

( * ) Notice: Subject to any disclaimer, the term of this patent is extended or adjusted under 35 U.S.C. 154(b) by 673 days.

This patent is subject to a terminal disclaimer.

(21) Appl. No.: 17/370,473

(22) Filed: Jul. 8, 2021

(65) Prior Publication Data

US 2022/0043425 A1 Feb. 10, 2022

Related U.S. Application Data

(63) Continuation of application No. 15/683,387, filed on Aug. 22, 2017, now Pat. No. 11,059,141.

(51) Int. Cl.
  *B23Q 15/12* (2006.01)
  *B23Q 15/08* (2006.01)
  *G05B 19/4155* (2006.01)
  *G05B 19/416* (2006.01)

(52) U.S. Cl.
  CPC ............. *B23Q 15/12* (2013.01); *B23Q 15/08* (2013.01); *G05B 19/4155* (2013.01); *G05B 19/4163* (2013.01); *G05B 2219/37355* (2013.01); *G05B 2219/37434* (2013.01)

(58) Field of Classification Search
  CPC .................. B23Q 15/12; G05B 19/404; G05B 2219/37436; G05B 19/4163; G05B 2219/37434

See application file for complete search history.

(56) References Cited

U.S. PATENT DOCUMENTS

| | | | |
|---|---|---|---|
| 4,031,368 A * | 6/1977 | Colding | G05B 19/4163 356/600 |
| 5,170,358 A | 12/1992 | Delio | |
| 6,071,219 A | 6/2000 | Cook | |
| 6,085,121 A | 7/2000 | Stern | |

(Continued)

FOREIGN PATENT DOCUMENTS

EP  1650624 A1  4/2006

*Primary Examiner* — Chad G Erdman
(74) *Attorney, Agent, or Firm* — Brooks Kushman P.C.

(57) ABSTRACT

A smart tool system may include at least one assembly of a tool holder and a tool, and a tooling machine configured to rotate the at least one assembly to cut a workpiece. The tooling machine may have a spindle to which the tool holder may be selectively attachable, and a controller configured to rotate the spindle at a spindle speed. The smart tool system may also include at least one database configured to store vibrational data relating to at least one of the at least one assembly and the tooling machine. The smart tool system may further be configured to determine an optimum operating value and/or range of optimum operating values of at least one parameter for the tooling machine based on the vibrational data. The optimum operating value(s) provide for minimized or no chatter when cutting the workpiece.

10 Claims, 3 Drawing Sheets

(56) References Cited

U.S. PATENT DOCUMENTS

| | | | |
|---|---|---|---|
| 6,662,073 | B1 | 12/2003 | Fujishima et al. |
| 7,177,713 | B2 | 2/2007 | Smith et al. |
| 8,131,525 | B2 | 3/2012 | Schmitz et al. |
| 8,707,193 | B2 | 4/2014 | Khazanov |
| 2002/0146296 | A1 | 10/2002 | Schmitz et al. |
| 2004/0236529 | A1 | 11/2004 | Esterling |
| 2009/0234490 | A1 | 9/2009 | Suprock et al. |
| 2010/0104388 | A1 | 4/2010 | Suzuki et al. |
| 2012/0010744 | A1 | 1/2012 | Yamashita et al. |
| 2012/0065766 | A1* | 3/2012 | Yoshino ............. B23Q 17/0976 700/173 |
| 2013/0046405 | A1* | 2/2013 | Shamoto ............. G05B 19/404 700/190 |
| 2014/0142872 | A1* | 5/2014 | Hedin ................. G05B 23/024 702/56 |
| 2015/0026107 | A1* | 1/2015 | Vijayaraghavan ..... G06Q 50/04 706/12 |
| 2015/0127139 | A1* | 5/2015 | Bolin ................. G05B 19/4065 700/173 |
| 2015/0254336 | A1 | 9/2015 | Besuchet et al. |
| 2016/0282224 | A1 | 9/2016 | Takada et al. |
| 2016/0288285 | A1* | 10/2016 | Piner ................. B23Q 17/0976 |
| 2016/0364687 | A1 | 12/2016 | Matson et al. |
| 2016/0375570 | A1* | 12/2016 | Boeck ................ G05B 19/4062 700/169 |
| 2017/0235294 | A1 | 8/2017 | Shapiro et al. |
| 2018/0004196 | A1 | 1/2018 | Kawai et al. |
| 2018/0292804 | A1* | 10/2018 | Berman ............. G05B 19/404 |

\* cited by examiner

SMART TOOL SYSTEM

CROSS-REFERENCE TO RELATED APPLICATIONS

This a continuation application based on and that claims priority to U.S. patent application Ser. No. 15/683,387 filed on Aug. 22, 2017, which issued as U.S. Pat. No. 11,059,141 on Jul. 13, 2021 and which is hereby incorporated by reference in its entirety.

FIELD OF TECHNOLOGY

The present disclosure pertains to a smart tool system for machine manufacturing operations, including, but not limited to, milling.

BACKGROUND

Tooling machines are used to perform manufacturing operations such as milling, cutting, drilling, and the like. Such machines generally have an end tool that comes into contact with a workpiece. The end tool is typically held in place by a tool holder, which in turn is connected to a spindle of the machine. To perform the manufacturing operation, the tool is spun at very high speeds. However, such high rotational speeds often result in a noise or chatter, which is caused by a resonant frequency that is created when the tool vibrates relative to the spindle. Chatter may limit performance, results, life of the tool, and/or effectiveness of the tool. Chatter generally may occur when the tool enters and exits cutting. The tool deflects when it (e.g., a tooth of the tool) makes contact with a workpiece, and then snaps back when the tool exits the workpiece, thereby causing vibration of the tool. Many tool holder systems hold the tool using only friction. This may lead to the tool twisting during the cut, which can change the vibrational frequency of the tool, thereby resulting in even more chatter.

For each instance of a manufacturing process, such as milling, there is an optimal speed at which chatter quiets down, thereby allowing heavier and more agressive cuts and increasing the life span of the tool. However, this optimal spindle speed varies for every different combination of machine, tool holder, cutting tool and tool overhang tool stickout length. To identify the optimal speed in current tool systems, the user purchases the tool and tool holder, assembles them into the machine, and balances the tool. The user then has to perform many iterations of test cuts and adjustment of the machine parameters before the optimal speed is ultimately determined. This iterative process is repeated for each tool and tool holder that is purchased and used in a particular machine, which may involve substantial amount of time and resources.

Accordingly, an improved, smart tool system is presented that more expediently determines and provides for the optimal spindle speed at which chatter is minimized such that balancing of a tooling machine and tool can in turn be minimized or eliminated altogether.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

An exemplary smart tool system may include at least one assembly of a tool holder and a tool, and a tooling machine configured to rotate the at least one assembly to cut a workpiece. The tooling machine may have a spindle to which the tool holder may be selectively attachable, and a controller configured to rotate the spindle at a spindle speed. The smart tool system may also include at least one data store configured to store vibrational data associated with at least the tooling machine. The smart tool system may further include at least one server configured to determine an optimum operating value and/or range of optimum operating values of at least one parameter for the tooling machine based on the vibrational data. The optimum operating value(s) may provide for minimized or no chatter when performing a manufacturing operation on the workpiece.

An exemplary method for minimizing or providing no chatter may include storing data relating to vibration of a tool blank attached to a tooling machine to which the tool is attached and by which the tool is spun. The method may also include determining at least one of an optimum operating value and a range of optimum operating values of at least one parameter for the tooling machine based on the data. The method may further include providing a tooling machine and a least one assembly of a tool holder and a tool configured to operate at the at least one of the optimum operating value and range of optimum operating values of the at least one parameter.

An exemplary method for operating a tooling machine and assembly of a tool holder and a tool without chatter or with minimal chatter may include first attaching the assembly of the tool holder and tool to a spindle of the tooling machine. The method may then include operating the tooling machine with an optimum operating value of at least one parameter determined based on vibrational data relating to at least one of the assembly and the tooling machine, as described in the exemplary method above. The resulting workpiece may be cut more efficiently and effectively, and the life of the tool, the tool holder, and/or the tooling machine may be maximized.

Figure 1:
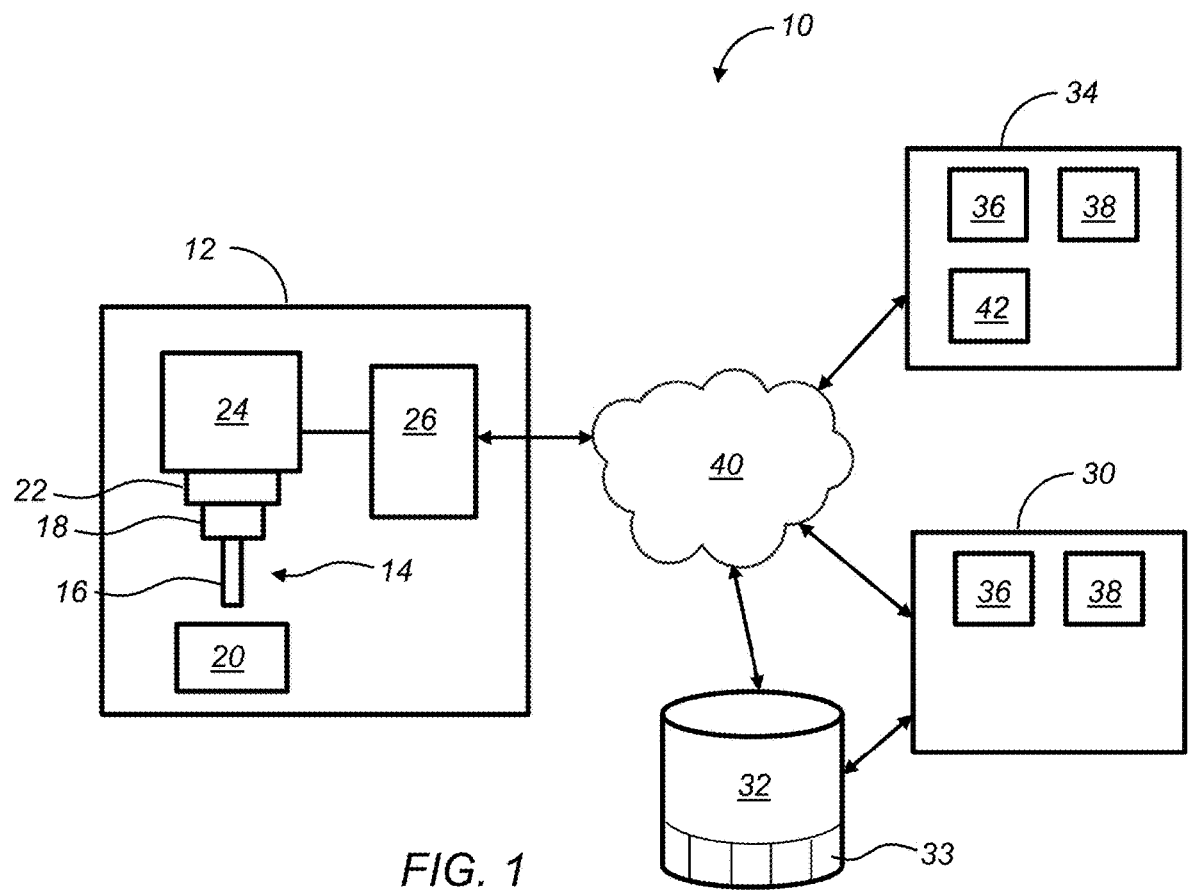
FIG. 1 is a schematic block diagram of an exemplary smart tool system.
Figure 2:
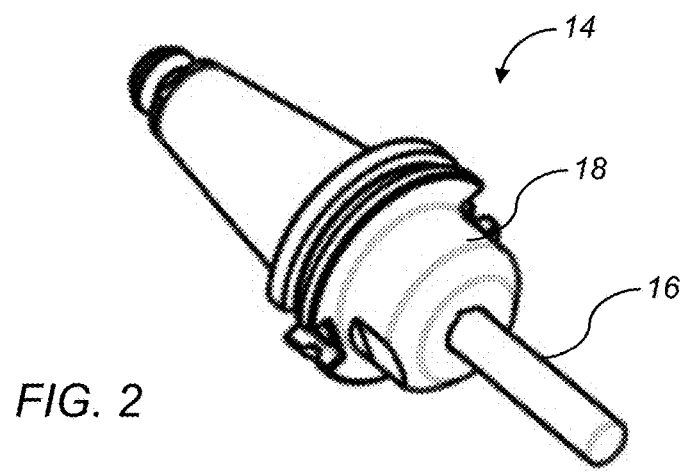
FIG. 2 is a perspective view of an exemplary assembly of a tool and a tool holder of the smart tool system of FIG. 1.

Referring now to the figures, FIG. 1 illustrates an exemplary smart tool system 10. The smart tool system 10 generally may include a tooling machine 12 and an assembly 14 of a tool 16 and a tool holder 18. An exemplary assembly 14 is illustrated in FIG. 2. The tooling machine 12 and the assembly 14 together may be used for different manufacturing processes, including, but not limited to, milling, cutting, drilling and the like, on a workpiece 20. To perform such manufacturing processes, the tool 14 may be, but is not limited to, an end mill. The tooling machine 12 may be any machine known in the art capable of causing the tool 14 to perform such manufacturing processes.

The tooling machine 12 may include a spindle 22 by which the assembly 14 may be selectively and removably attached to the tooling machine 12. The tooling machine 12 generally may move and/or rotate the assembly 14 such that the tool 16 may cut or otherwise shape the workpiece 20. To do so, the tooling machine 12 may also include a movement mechanism 24. While FIG. 1 schematically illustrates just one movement mechanism 24, it should be appreciated that there may be any number of movement mechanisms 24 configured to move the assembly 14 in one or more directions and/or rotate the assembly 14. The movement mechanism 24 may be any known device, mechanism, and the like known in the art to be able to provide such movement and/or rotation, including, but not limited to, a motor.

The tooling machine 12 may further include a controller 26 in communication with the movement mechanism(s) 24 and configured to receive and transmit data, information, and/or commands from and to the movement mechanism(s) 24 and/or the spindle 22. For example, the controller 26 may be configured to operate the movement mechanism(s) 24 at defined parameters, as described in more detail hereinafter. Such parameters may include, but are not limited to, rotational speed of the spindle 22 (i.e., spindle speed), depth of each cut on the workpiece 20, width of each cut, and feed rate of the assembly 14/tool 16 relative to the workpiece 20.

The smart tool system 10 may also include a server 30 and a data store 32. While FIG. 1 illustrates one server 30 and one data store 32, it should be appreciated that there may be any number of servers 30 and data stores 32 configured to do the same or different functions described below. The server 30 and the data store 32 may be in communication over a communications network 40. The communications network 120 may include, but is not limited to any combination of, Ethernet, Bluetooth, Wi-Fi, Wi-Fi protocols (802.11b, 802.11g, 802.11n, etc.), 3G, 4G, 5G, LTE, or any other wired or wireless communications mechanisms. In addition or alternatively, the server 30 and the data store 32 may be directly connected to the tooling machine 12. While FIG. 1 illustrates data store 32 as a separate and distinct component from the server 30, it should be appreciated that the data store 32 may be an internal component of the server 30. The server 30 and/or the data store 32 may also be in communication with the controller 26 of the tooling machine 12 over the communications network 40 to transmit and/or receive data to/from the controller 26, including, but not limited to, operational parameters of the tooling machine 12, use-based statistics, such as the number and/or duration of use(s) of a particular tool 16/assembly 14, and the like.

The smart tool system 10 may further include at least one user computing device 34 in communication with the server 30, the data store 32, and/or the controller 26 over the communications network 40. The user computing device 34 may have a user interface 42 on which a human machine interface (HMI) may be generated. The user interface 42 may include any display or mechanism to connect to a display, support user interfaces, and the like. The user interface 42 may include any input or output device to facilitate the receipt or presentation of information (e.g., user or product attributes) in audio, visual or tactile form or a combination thereof. Examples of a display may include, without limitation, a touchscreen, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like. The display may present user interfaces to any user of the user computing device 34.

The user computing device 34 may interact with server 30 and/or data store 32 to select and/or provide the particular values of operating parameters of tooling machine 12 that server 30 may be configured to determine are or are not optimal. For example, server 30 may provide to the user interface 42 an HMI in which a particular tooling machine 12 and tool 16 may be selected. Server 30 may then provide an HMI, such as the HMI 200 illustrated in FIG. 4, in which the particular values of operating parameters of the selected tooling machine 12 and tool 16 may be input or otherwise provided to the server 30.

In general, during operation of a tooling machine and a tool, such as the tooling machine 12 and the tool 16, the tool may experience vibrational frequencies due to the high rotational speed at which it is required to cut a particular workpiece, such as the workpiece 20. These vibrational frequencies may vary based on characteristics of the particular tooling machine and/or tool, including, but not limited to, number of teeth at the end of the tool cutting the workpiece, a stickout length of the tool, i.e., a distance that the tool sticks out from the tool holder, and the like. The vibrational frequencies also may vary based on operating parameters, including, but not limited to, spindle speed, depth of each cut, width of each cut, and feed rate of the tool. Thus, for each combination of a tooling machine and a tool, the vibrational frequency may differ. For each combination, the parameters may be set at optimal values to result in a vibrational frequency at which chatter is minimized or eliminated. The smart tool system 10 enables such optimal values or range of values to be determined such that operation of the tooling machine 12 and assembly 14 do not result in chatter or result in only minimal chatter.

Figure 3:
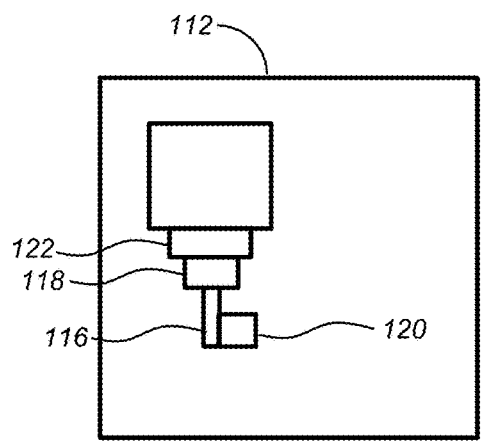
FIG. 3 is a schematic block diagram of an exemplary tooling machine incorporating a tool blank to obtain vibrational data.

Referring now to FIG. 3, an exemplary model tooling machine 112 is illustrated. Tooling machine 112 generally may be the same kind, e.g., have the same configuration, size, functionality, as tooling machine 12, and may be used as a model for capturing data relating to vibrational frequencies that may be used to ultimately determine optimal parameters at which to operate tooling machine 12. Tooling machine 112 may similarly have a spindle 122 to which a tool holder 118 may be attached. However, a tool blank or artifact 116 is used instead of an actual tool. The tool blank 116 may serve as a representation of any number of different tools 12 (e.g., different material, diameter, length). A tap test may be performed on the tool blank 116 rather than the different tools. Specifically, a sensor 120 may be placed on the tool blank 116 to measure vibrational frequencies of the tool blank 116 when tapped by a hammer, thereby simulating the vibrational frequencies that occur during operation of the tooling machine 112. The vibrational frequencies may then be recorded and/or stored in the data store 32. This procedure may be done for any number of tooling machines 112, thereby creating a database 33 of vibrational frequencies for different tooling machines. Server 30 may then use this data to determine whether certain operating parameters of a particular tooling machine, such as tooling machine 12, with a particular tool, such as tool 16, would result in optimal performance, i.e., no chatter or minimal chatter.

Figure 4:
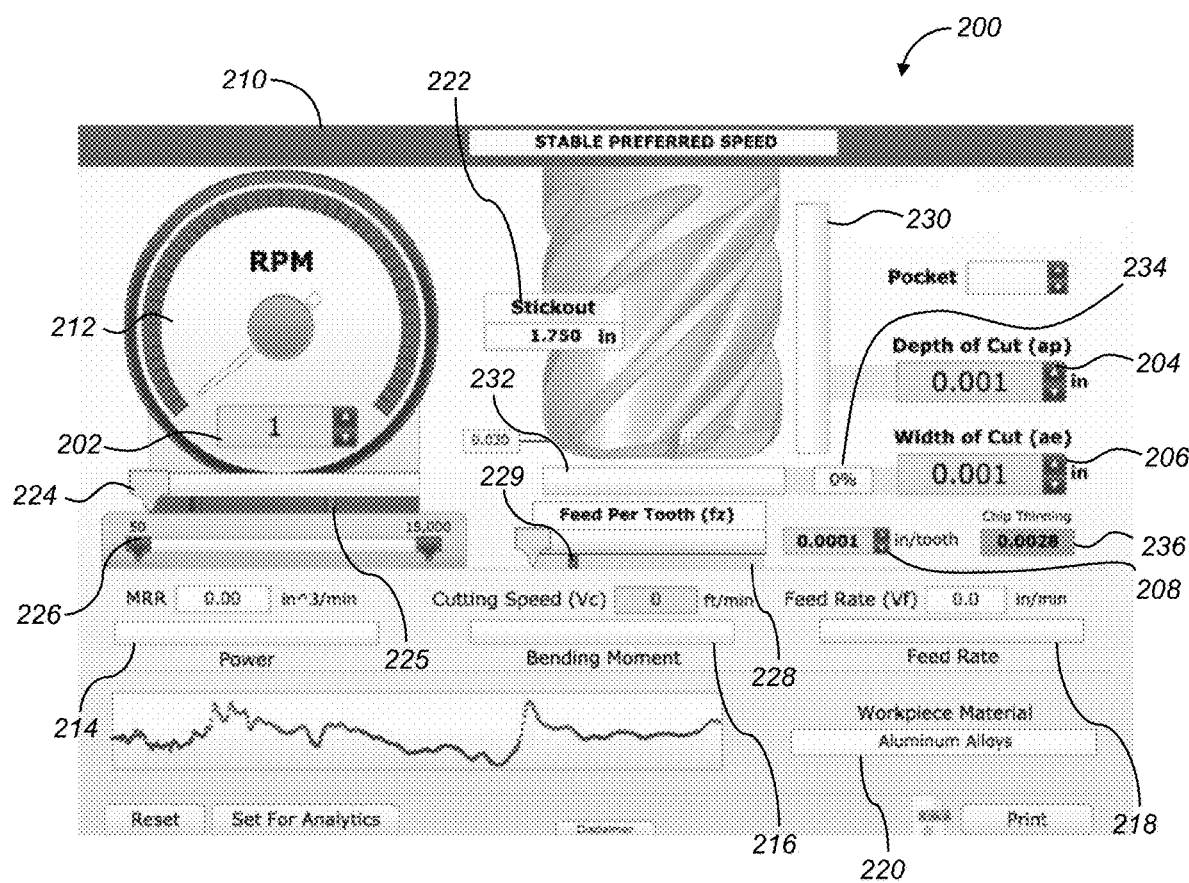
FIG. 4 is an exemplary interactive graphic generated and displayed on a user computing device of the smart tool system of FIG. 1.

Referring now to FIG. 4, an exemplary HMI 200 may include different user input fields 202, 204, 206, and 208 for spindle speed, depth of cut, width of cut, and feed rate, respectively. It should be appreciated that there may be more or less input fields. As shown in FIG. 4, values for the parameters may be alternatively provided and/or adjusted using up and down arrows, sliders, and the like. For example, the spindle speed may be set and adjusted via a slider bar 224. Server 30 may be configured to determine at what speeds may result in resonant frequencies that generally should be avoided, and indicate them on slider bar 224 as one or more bands 225 or any other indicator. The lower limit and upper limit of the spindle speed range may be adjusted via a slider bar 226. The feed rate may be set and adjusted via a slider bar 228, which may also provide an indicator or band 229 of a recommended setting for the particular tool 16 and/or tooling machine 12. Similarly, the depth of cut and width of cut may be set and adjusted via slider bars 230 and 232, respectively. When the depth of cut and/or the width of cut has been set to a value below a threshold percentage, for example, below 50%, as indicated in field 234, server 30 may be configured to determine a recommended chip thinning amount, and to cause the HMI to display the recommendation, as indicated in field 236. The chip thinning may be radial chip thinning if the width of the cut is below the threshold percentage, or may be axial chip thinning if the depth of the cut is below the threshold percentage.

After parameter values have been set, server 30 may then determine a status condition of the tooling machine 12 and assembly 14 based on the provided parameter values, and based on the vibrational data corresponding to the particular tooling machine 12 stored in data store 32. The status conditions may include, but are not limited to, chatter, stable resonant risk, stable chatter risk, and stable preferred speed, as illustrated in FIG. 4. Server 30 may communicate this status condition by having HMI 200 include a status condition bar 210. Server 30 may also provide additional information in the HMI 200 that may be helpful for a user in selecting parameter values. For example, the HMI 200 may indicate on a speed dial 212 which speeds are stable and which are unstable. The HMI 200 may provide information relating to operating limits of the tooling machine 12, including, but not limited to, power 214, bending moment 216, and feed rate 218. The information may indicate to the user if the selected parameters cause any of the operating limits to be exceeded. The HMI 200 may further include information relating to the tool 16, including, but not limited to the tool material 220 and a stickout length 222 at which the tool blank 116 was tested.

Referring back to FIG. 1, the user computing device 34 may be associated with a particular user account. The user account may have a lineup of different tooling machines 12 and/or assemblies 14 associated with the account. This information may be stored in data store 32. The optimal values of the parameters for each combination of tooling machines 12 may be stored under the user account in data store 32. In addition, performance data and/or information of the tooling machines 12 and/or tools 16 may be transmitted from the controllers 26 of the tooling machines 12 and/or a user computing device 34 to the server 30 to be analyzed and/or stored in the data store 32. This information may be accessible by the user computing device 34 through an HMI generated by the server 30 on the user interface 42 of the user computing device 34.

In general, computing systems and/or devices, such as the server 30 and/or the user computing device 34, may include at least one memory 36 and at least one processor 38. Moreover, they may employ any of a number of computer operating systems, including, but not limited to, versions and/or varieties of the Microsoft Windows® operating system, the Unix operating system (e.g., the Solaris® operating system distributed by Oracle Corporation of Redwood Shores, California), CentOS, the AIX UNIX operating system distributed by International Business Machines of Armonk, New York, the Linux operating system, the Mac OS X and iOS operating systems distributed by Apple Inc. of Cupertino, California, the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a handheld computer, a smartphone, a tablet, or some other computing system and/or device.

Such computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, Tomcat, representational state transfer (REST), etc. In general, the processor (e.g., a microprocessor) receives instructions, e.g., from the memory, a computer-readable medium, etc., and executes these instructions, thereby performing one or more processes including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instruction) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including, but not limited to, coaxial cables, copper wire, and fiber optics, including the wires that comprise a system bus coupled to a processor of a computer. Common forms of computer-readable media include, for example, a floppy disk, a flexible disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as the data store 32, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Alternatively, the application software product may be provided as hardware or firmware, or combinations of software, hardware, and/or firmware.

Figure 5:
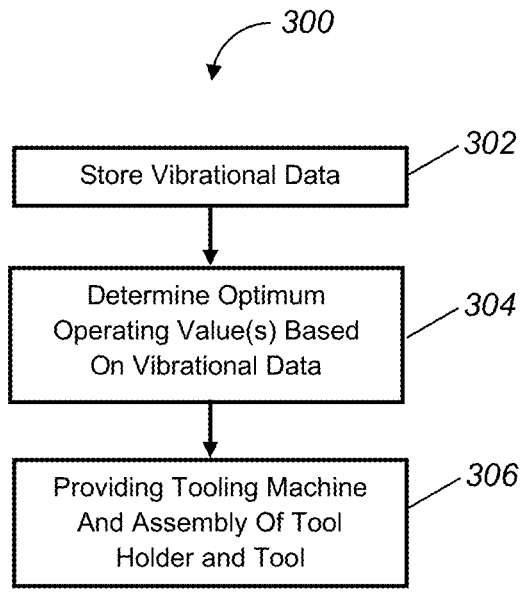
FIG. 5 is a schematic flow diagram of an exemplary process for minimizing or eliminating chatter during cutting of a workpiece.

Referring now to FIG. 5, an exemplary method 300 for minimizing or providing no chatter during a machining operation on a workpiece is illustrated. While method 300 is described with respect to the smart tool system 10, it should be appreciated that any system having components capable of performing the steps of method 300 is contemplated. Method 300 may begin at step 302 at which data relating to vibration frequency associated with at least one tooling machine, which may include the tooling machine 12, may be stored in at least one data store 32. As explained above, the data may include frequencies at which a tool blank or artifact vibrates in a particular tooling machine, as obtained from a tap test on the tool blank and tooling machine.

After step 302, method 300 may proceed to step 304 at which a server 30 may determine an optimum value or range of values of at least one parameter at which a particular tooling machine 12 and tool 16 may operate such that there is no chatter or chatter is minimized, based on the data stored in step 302. This may include determining that particular values of different operating parameters of the tooling machine 12 result in optimal performance. For example, step 304 may include generating an HMI, such as HMI 200 illustrated in FIG. 4, on a graphical user interface of a user computing device 34, and receiving operating values of parameters of the tooling machine 12, including, but not limited to, spindle speed, width and depth of cuts, and feed rate. Step 304 may then include determining, based on the data stored in step 302, whether or not the received values result in a stable preferred speed, or if they result in chatter or other status conditions, such as stable resonant risk or stable chatter risk.

After step 304, method 300 may proceed to step 306 at which the tooling machine 12 and an assembly 14 of the tool 16 and tool holder 18 may be provided. The tooling machine 12 may be balanced to operate at the optimum operating value and/or range of optimum operating values of the at least one parameter. Thus, the tooling machine 12 and tool 16 does not need any additional balancing, and may be used immediately upon being provided.

Figure 6:
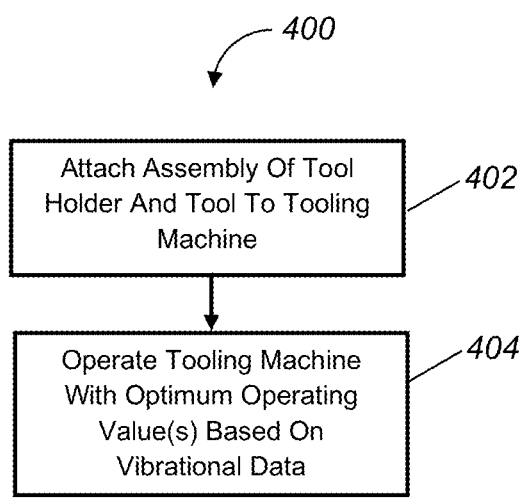
FIG. 6 is a schematic flow diagram of an exemplary process of operating the tooling machine and assembly of a tool and a tool holder of the smart tool system of FIG. 1.

Referring now to FIG. 6, an exemplary method 400 for operating a tooling machine and assembly of a tool holder and a tool without chatter or with minimal chatter is illustrated. While method 400 is described with respect to the system 10, it should be appreciated that any system having components to which the steps of method 400 are applicable is contemplated. Method 400 may begin at step 402 at which an assembly 14 of a tool 16 and tool holder 18 may be attached to a tooling machine 12, for example, to a spindle 22 of the tooling machine 12. At step 404, the tooling machine 12 may be operated at an optimum operating value or range of values of at least one parameter. The optimum operating value or range of values may be based on vibrational data relating to at least one of the assembly 14 and the tooling machine 12. The optimum operating value(s) may be input into a controller 26 of the tooling machine 12, which may in turn operate a movement mechanism 24 of the tooling machine 12 to move the assembly 14, including rotating the assembly 14 at an optimal spindle speed at which there is no chatter or chatter is minimized.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A smart tool system, comprising:
   a tool holder and a tool assembly;
   a tooling machine to which the assembly is attachable, the tooling machine being configured to rotate the assembly to cut a workpiece, the tooling machine having a spindle to which the tool holder is attachable;
   a database storing vibrational data associated with the tooling machine;
   a user computing device and a server in communication with one another;
   wherein the server is configured to provide to the user computing device selectable values of a plurality of parameters and an input field in which the value of a parameter is inputtable, to receive inputted values of the parameters from the user computing device, to determine whether the received values will result in a status condition of the machining tool of one of a stable preferred speed, chatter, stable resonant risk, or stable chatter risk based on the vibrational data stored in the database, and to display the determined status condition on a display of the user computing device,
   wherein responsive to an input for at least one of a depth of cut or a width of cut being below a respective threshold percentage, the server is further configured to determine a recommended chip thinning amount, and to display the recommended chip thinning amount on the display of the user computing device.

2. The smart tool system of claim 1, wherein the plurality of parameters includes at least one of a spindle speed, a depth of a cut.

3. The smart tool system of claim 1, wherein the server is configured to determine whether the received inputted values of the plurality of parameters is optimal for operation.

4. The smart tool system of claim 1, wherein the optimum operating values of the plurality of parameters results in a status condition of stable preferred speed.

5. The smart tool system of claim 1, wherein the tooling machine is a milling machine, and the tool is an end mill.

6. The smart tool system of claim 1, wherein the database is configured to store data related to usage of at least one of the tooling machine or the tool holder and tool assembly, the user computing device being able to access the data related to the usage of the at least one of the tooling machine and the tool holder and tool assembly.

7. The smart tool system of claim 1, wherein at least one of:
the recommended chip thinning amount is for radial chip thinning if the inputted width of the cut is below the respective threshold percentage; and
the recommended chip thinning amount is for axial chip thinning if the depth of the cut is below the threshold percentage.

8. The smart tool system of claim 1, wherein the server is configured to display on the user computing device a speed dial, and which speeds are stable and which are unstable on the speed dial.

9. The smart tool system of claim 1, wherein the server is configured to display on the user computing device at least one of:
information relating to the tool, including tool material or stickout length; or
information relating to operating limits of the tooling machine, including power, or bending moment, or feed rate.

10. A method comprising:
inputting, via a user computing device, values of a plurality of parameters including at least one of spindle speed or a feed rate of a tooling assembly;
receiving, from a server, an indication of whether the values of the plurality of parameters will result in a status condition of a tooling machine, the status condition can be one of stable preferred speed, chatter, stable resonant risk, or stable chatter risk, based on vibration data relating to the assembly or the tooling machine, the vibrational data corresponding to vibrational data of a tool blank corresponding to a tool; and
operating the tooling machine with the values of the parameters that result in a status condition of a stable preferred speed,
wherein inputting, via the user computing device, further includes inputting the plurality of parameters including at least one of a depth of a cut or a width of the cut;
comparing the at least one of the depth of the cut or the width of the cut to a respective threshold percentage; and
determining a recommended chip thinning amount based on the comparison of the at least one of the depth of the cut or the width of the cut to the respective threshold percentage.

* * * * *